US008132123B2

(12) United States Patent
Schrag et al.

(10) Patent No.: US 8,132,123 B2
(45) Date of Patent: Mar. 6, 2012

(54) 3D SCENE ORIENTATION INDICATOR SYSTEM WITH SCENE ORIENTATION CHANGE CAPABILITY

(75) Inventors: John Schrag, Toronto (CA); Steven Takashi Watanabe, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 41 days.

(21) Appl. No.: 12/805,970

(22) Filed: Aug. 26, 2010

(65) Prior Publication Data

US 2011/0066963 A1   Mar. 17, 2011

Related U.S. Application Data

(63) Continuation of application No. 10/627,974, filed on Jul. 28, 2003, now Pat. No. 7,814,436.

(51) Int. Cl.
*G06F 3/048* (2006.01)
*G06F 3/00* (2006.01)

(52) U.S. Cl. ........ 715/851; 715/836; 715/837; 715/850; 715/852

(58) Field of Classification Search .................. 715/782, 715/821, 830, 836, 837, 850, 851, 852; 345/419, 345/594, 619, 649, 650
See application file for complete search history.

(56) References Cited

U.S. PATENT DOCUMENTS

| 4,539,585 A | 9/1985 | Spackova et al. |
| 4,791,478 A | 12/1988 | Tredwell et al. |
| 5,303,337 A | 4/1994 | Ishida |
| 5,511,157 A | 4/1996 | Wang |
| 5,588,098 A | 12/1996 | Chen et al. |
| 5,608,850 A | 3/1997 | Robertson |
| 5,734,805 A | 3/1998 | Isensee et al. |
| 5,825,365 A | 10/1998 | Hirota et al. |
| 5,835,692 A | 11/1998 | Cragun et al. |
| 5,861,889 A | 1/1999 | Wallace et al. |
| 5,943,037 A | 8/1999 | Hosking et al. |
| 6,040,839 A | 3/2000 | Van Eldik et al. |
| 6,046,749 A | 4/2000 | Anderson |

(Continued)

OTHER PUBLICATIONS

"VRML Engineering Applications", Beazley, William et al., Information Assets, Inc., pp. 1-4, 1996.

(Continued)

*Primary Examiner* — Nicholas Augustine
(74) *Attorney, Agent, or Firm* — Staas & Halsey LLP

(57) ABSTRACT

The present invention is a system that provides an orientation indicator graphical user interface element in a display view of a three-dimensional scene. The orientation indicator can be used to automatically change a view of the scene to a predetermined viewpoint. The indicator includes view direction indicating controls that when activated cause the view of the scene to change to a view direction indicated by the control. The direction can be indicated by a shape of the control, such as by a cone with a point pointing in the direction of the view, or by the location of the control, such as being located on a marked scene axis of the indicator. The view of the scene is also automatically adjusted at the view position to center an object of interest in the scene and zoomed in/out to fit the object to the display view. The indicator is part of the three-dimensional scene and moves with the scene as the scene is manipulated by a user, such as in tumbling the scene. The indicator is held at a fixed position and size in the display view, such as in a corner of the display view, by moving the indicator about within the scene and changing the size of the indicator.

17 Claims, 18 Drawing Sheets

U.S. PATENT DOCUMENTS

| | | |
|---|---|---|
| 6,198,487 B1 | 3/2001 | Fortenbery et al. |
| 6,281,906 B1 | 8/2001 | Anderson |
| 6,346,938 B1 | 2/2002 | Chan et al. |
| 6,597,380 B1 | 7/2003 | Wang et al. |
| 6,664,986 B1 | 12/2003 | Kopelman et al. |
| 6,801,217 B2 | 10/2004 | Anderson |
| 6,941,516 B2 | 9/2005 | Nie et al. |
| 6,987,512 B2 | 1/2006 | Robertson et al. |
| 7,016,824 B2 | 3/2006 | Waupotitsch et al. |
| 7,119,819 B1 | 10/2006 | Robertson et al. |
| 7,190,365 B2 | 3/2007 | Fleury |
| 7,347,690 B2 | 3/2008 | Jordan et al. |
| 7,353,192 B1 | 4/2008 | Ellis et al. |
| 2003/0156126 A1 | 8/2003 | Tsuji |
| 2006/0025679 A1 | 2/2006 | Viswanathan et al. |

OTHER PUBLICATIONS

"Use the View Panel", Alias Studio Tools Version 9.0, pp. 124-124, Nov. 1998.

Balakrishnan et al. (1999) "Exploring bimanual camera control and object manipulation in 3D graphics interfaces," In Proceedings of ACM CHI, pp. 56-63.

W. Bares et al., (2001) "Generating Virtual Camera Compositions," In Proceedings of ACM IUI'01, pp. 9-12.

W. Bares et al., (1999) "Intelligent Multi-Shot Visualization Interfaces for Dynamic 3D Worlds," Proceedings of ACM IUI '99, pp. 119-126.

P. Baudisch et al., (2005) "Snap-andgo: helping users align objects without the modality of traditional snapping," In ACM Proceedings of the SIGCHI Conference on Human Factors in Computing Systems, CHI '05, pp. 301-310.

E. A. Bier, (1990) "Snap-dragging in three dimensions," In ACM Proceedings of the 1990 Symposium on interactive 3D Graphics, pp. 193-204.

D. Bowman et al., (1999) "Testbed environment of virtual environment interaction," In Proceedings of ACM VRST, pp. 26-33.

D. Bowman et al., (1997) "Travel in immersive virtual environments," IEEE VRAIS'97 Virtual Reality Annual International Symposium, pp. 45-52.

N. Burtnyk et al.,(2002) "StyleCam: Interactive Stylized 3D Navigation using integrated Spatial and Temporal Controls," In Proceedings of ACM UIST 2002, pp. 101-110.

D. B. Christianson et al., (1996) "Declarative camera control for automatic cinematography," Proceedings of AAAI '96 (Portland, OR), pp. 148-155.

S. Drucker et al., (1995) "CamDroid: A System for Implementing Intelligent Camera Control," In Proceedings of ACM Symposium on Interactive 3D Graphics, pp. 139-144.

Galyean, T. (1995) "Guided navigation of virtual environments," ACM Symposium on Interactive 3D Graphics, pp. 103-104.

M. Gliecher et al. (1992) "Through-the-lens camera control," ACM SIGGRAPH 92, pp. 331-340.

T. Grossman et al., (2001) "Interaction techniques for 3D modeling on large displays." In Proceedings of the 2001 Symposium on interactive 3D Graphics SI3D '01, pp. 17-23.

A. Hanson et al., (1997) "Constrained 3D navigation with 2D controllers," IEEE Visulization, pp. 175-182.

L. He et al., (1996) "The virtual cinematographer: a paradigm for automatic real-time camera control and directing," ACM SIGGRAPH 96, pp. 217-224.

D. A. Henderson et al. (1986) "Rooms: the use of multiple virtual workspaces to reduce space contention in a window-based graphical user interface," ACM Transactions on Graphics (TOG), 5(3), pp. 211-243.

T. Igarashi et al., (1998) "Path drawing for 3D walkthrough," ACM UIST, pp. 173-174.

S. Jul et al., (1998) "Critical zones in desert fog: aids to multiscale navigation," ACM Symposium on User Interface Software and Technology, pp. 97-106.

A. Khan et al., (2005) "HoverCam: interactive 3D navigation for proximal object inspection," In Proceedings of ACM Symposium on Interactive 3D graphics and games, pp. 73-80.

J. Mackinlay et al., (1990) "Rapid controlled movement through a virtual 3D workspace," ACM SIGGRAPH 90, pp. 171-176.

C. B. Phillips et al., (1992) "Automatic Viewing Control for 3D Direct Manipulation," In ACM Proceedings of ACM Symposium on Interactive 3D Graphics, pp. 71-74.

J. S. Pierce et al., (1999) "Toolspaces and glances: storing, accessing, and retrieving objects in 3D desktop applications," In ACM Proceedings of the 1999 Symposium on interactive 3D Graphics, SI3D, pp. 163-168.

S. Rezzonico et al., (1996) "Browsing 3D Bookmarks in BED," WebNet 1996.

G. Robertson et al., (1989) "The cognitive coprocessor architecture for interactive user interfaces," In Proceedings of ACM UIST 1989, pp. 10-18.

G. Smith et al., (2001) "3D Scene Manipulation with 2D Devices and Constraints," Proceedings of Graphics Interface, pp. 135-142.

A. Steed (1997) "Efficient navigation around complex virtual environments," ACM VRST, pp. 173-180.

R. Stoakley et al., (1995) "Virtual reality on a WIM: Interactive worlds in miniature," ACM CHI, pp. 265-272.

S. L. Stoev et al. (2002) "A Case Study on Automatic Camera Placement and Motion for Visualizing Historical Data," Proceedings of IEEE Visualization, pp. 545-558.

D. Tan et al., (2001) "Exploring 3D navigation: combining speed-coupled flying with orbiting," ACM CHI, pp. 418-425.

M. Tory et al. (2004) "Combining 2D and 3D views for orientation and relative position tasks," In ACM Proceedings of the SIGCHI Conference on Human Factors in Computing Systems, CHI '04, pp. 73-80.

M. Wan et al. (2001) "Distance-Field Based Skeletons for Virtual Navigation," IEEE Visualization 2001, pp 239-245.

C. Ware et al., (1997) "Context sensitive flying interface," ACM Symposium on Interactive 3D Graphics, pp. 127-130.

C. Ware et al., (1990) "Exploration and virtual camera control in virtual three dimensional environments," ACM Symposium on Interactive 3D Graphics, pp. 175-183.

R. Zeleznik et al., (1999) "UniCam—2D Gestural Camera Controls for 3D Environments," ACM Symposium on Interactive 3D Graphics, pp. 169-173.

R. Zeleznik et al., (1997) "Two pointer input for 3D interaction," ACM Symposium on Interactive 3D Graphics, pp. 115-120.

U.S. Appl. No. 10/627,974, filed Jul. 28, 2003, John Schrag, et al.

U.S. Appl. No. 11/729,211, filed May 18, 2007, Azam Khan et al.

Office Action issued in parent U.S. Appl. No. 10/627,974, mailed Dec. 4, 2006.

Office Action issued in parent U.S. Appl. No. 10/627,974, mailed May 18, 2007.

Advisory Action issued in parent U.S. Appl. No. 10/627,974, mailed Sep. 28, 2007.

Office Action issued in parent U.S. Appl. No. 10/627,974, mailed Jan. 10, 2008.

Office Action issued in parent U.S. Appl. No. 10/627,974, mailed Jul. 25, 2008.

Advisory Action issued in parent U.S. Appl. No. 10/627,974, mailed Nov. 25, 2008.

Advisory Action issued in parent U.S. Appl. No. 10/627,974, mailed Jan. 2, 2009.

Office Action issued in parent U.S. Appl. No. 10/627,974, mailed Feb. 25, 2009.

Office Action issued in parent U.S. Appl. No. 10/627,974, mailed Aug. 19, 2009.

Notice of Allowance and Issue Fee Transmittal issued in parent U.S. Appl. No. 10/627,974, mailed May 26, 2010.

N. Burtnyk et al. (2006) ShowMotion: camera motion based 3D design review. In Proceedings of the 2006, Symposium on interactive 3D Graphics and Games, SI3D '06, pp. 167-174.

O. Chapuis et al. (2005) Metisse is not a 3D desktop!. In Proceedings of the 18th Annual ACM Symposium on User interface Software and Technology, UIST '05, pp. 13-22.

L. Chittaro et al. (2004) 3D location-pointing as a navigation aid in Virtual Environments. In ACM Proceedings of the Working Conference on Advanced Visual interfaces (Gallipoli, Italy, May 25-28, 2004). AVI '04, pp. 267-274.

R. Komerska et al, (2003) "Haptic-GeoZui3D: Exploring the Use of Haptics in AUV Path Planning", Proceedings 13th International Symposium on Unmanned Untethered Submersible Technology (UUST'03), Durham, NH.

K. Singh et al., (2004) Visualizing 3D Scenes using Non-Linear Projections and Data Mining of Previous Camera Moves. In Proceedings of ACM Computer Graphics, Virtual Reality, Visualization and Interaction in Africa, pp. 41-48.

M. Tory (2003) Mental Registration of 2D and 3D Visualizations (An Empirical Study). In Proceedings of the 14th IEEE Visualization 2003 (Vis'03) pp. 371-379.

M. Tory et al. (2003) Comparing ExoVis, Orientation Icon, and In-Place 3D Visualization Techniques. In Proceedings of Graphics Interface, pp. 57-64.

Komerska et al., "Haptic Task Constraints for 3D Interaction", http://ieeexplore.ieee.org/iel5/8472/26696/01191295.pdf?tp=&isnumber=&arnumber=1191295, 2003.

IEEE Xplore 2.0, "Haptic Interfaces for Virtual Environment a . . . eleoperator Systems, 2003, HAPTICS 2003. Proceedings. 11th Symposium on", http://ieeexplore.ieee.org/xpl/tocresult.jsp?isnumber=26696&isYear=2003&count=60&page=0&ResultStart=0.

HAPTICS 2003, "11th Symposium on Haptic Interfaces for Virtual Environment and Teleoperator Systems", Mar. 22-23, 2003.

Office Action issued in related U.S. Appl. No. 11/729,211 mailed Dec. 9, 2009.

Notice of Allowance and Issue Fee Transmittal issued in related U.S. Appl. No. 11/729,211 mailed Apr. 16, 2010.

Issue Notification issued in related U.S. Appl. No. 11/729,211 mailed Aug. 4, 2010.

3D SCENE ORIENTATION INDICATOR SYSTEM WITH SCENE ORIENTATION CHANGE CAPABILITY

This application is a continuation of prior U.S. patent application Ser. No. 10/627,974, filed Jul. 28, 2003 now U.S Pat. No. 7,814,436, the entire contents of which are incorporated herein by reference.

BACKGROUND

1. Field

The present invention is directed to a widget or graphical user interface (GUI) element that depicts three-dimensional (3D) scene orientation and includes direction indicating controls that allow a user to orient a view of the 3D scene to align with the direction indicated by the selected control and, more particularly, to a GUI element that is resident within the 3D scene, stays aligned with the scene as the scene is tumbled by the user, remains in the same position and at the same size in the display as the view changes, and has controls that automatically rotate the scene to a predetermined view when selected where a scene object is centered in the display and sized to fit the display.

2. Description of the Related Art

In the three-dimensional (3D) graphics art where computers are used to perform animation, 3D modeling and other tasks in which a 3D scene is depicted, it is important to orient the user to the view into the scene and to allow the user to easily change the view into the scene. Conventional interfaces 10 in the 3D art, such as shown in FIG. 1, can include an orientation gnomon 12 located in a display associated with a 3D scene 14. As the view changes, the gnomon in the display is adjusted to reflect changes in the view into the scene. The gnomon can also be located in the center of the scene or at the origin of the axes of the 3D scene. This gnomon cannot be used to change a view of the 3D scene.

What is needed is a gnomon that can be used to change a view of a 3D scene.

When a user wants to change the view of a scene, such as depicted in FIG. 1, to a particular desired view, the user can manipulate (tumble, rotate, translate, etc.) the scene to get the desired view. However, the user must be particularly aware of the current view and the manipulations needed to get to the desired view. This can be difficult if the view has been tumbled a number of different times along complex tumbling pathways. The user can also change the view to a desired view among a number of predefined views using a menu as depicted in FIG. 1. FIG. 1 depicts a pending selection of a back view. The menu selection view change process requires that the user move through a number of different menu levels (3 in this example) to make such a selection, which takes time that may be considered wasted. However, even when provided with such a menu, the menu selection needed to get the desired view based on the current view is often not readily apparent especially to an unsophisticated user.

What is needed is a system that provides the user with orientation information and selectable controls for view manipulation that do not require a complex selection process and that visually guide the user to a desired view with directional aids associated with the selection controls.

SUMMARY

It is an aspect of the present invention to provide an in scene three-dimensional orientation indicator that automatically remains aligned with the orientation of a three-dimensional (3D) scene.

It is an additional aspect of the present invention to provide an in-scene indicator that remains positioned at a predetermined position in the display and at a predetermined size in the display as the scene is manipulated into different views by the user.

It is another aspect of the present invention to provide the indicator with controls or buttons that can be used to change the view of the scene.

It is also an aspect of the present invention to provide the orientation indicator with direction indicators associated with the controls that indicate the direction of the various views that can be selected.

It is a further aspect of the present invention to automatically center and fit the objects in the 3D scene to the display view subsequent to a view change.

The above aspects can be attained by a system that provides an orientation indicator graphical user interface element in a three-dimensional scene where the orientation indicator can be used to automatically change a view of the scene to a predetermined viewpoint. The indicator includes controls that when activated or selected cause the view of the scene to change to a view direction indicated by the control. The view direction associated with a particular control can be indicated by a shape of the control or by the location of a control. The view of the scene is also automatically adjusted at the selected view position to center an object of interest in the scene in the display view and to fit the object to the display view. The indicator is moved about within the scene and changed in size to position the indicator at a predetermined fixed position in the users display view and at a predetermined fixed size.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The present invention is a graphical user interface (GUI) orientation indicator element indicating the orientation of a three-dimensional (3D) scene that has directional buttons or controls that allow the orientation to be changed to align a display view of the scene with the direction indicated by a selected button. The invention can be called a view compass GUI element, tool or widget or just a view compass.

Figure 1:
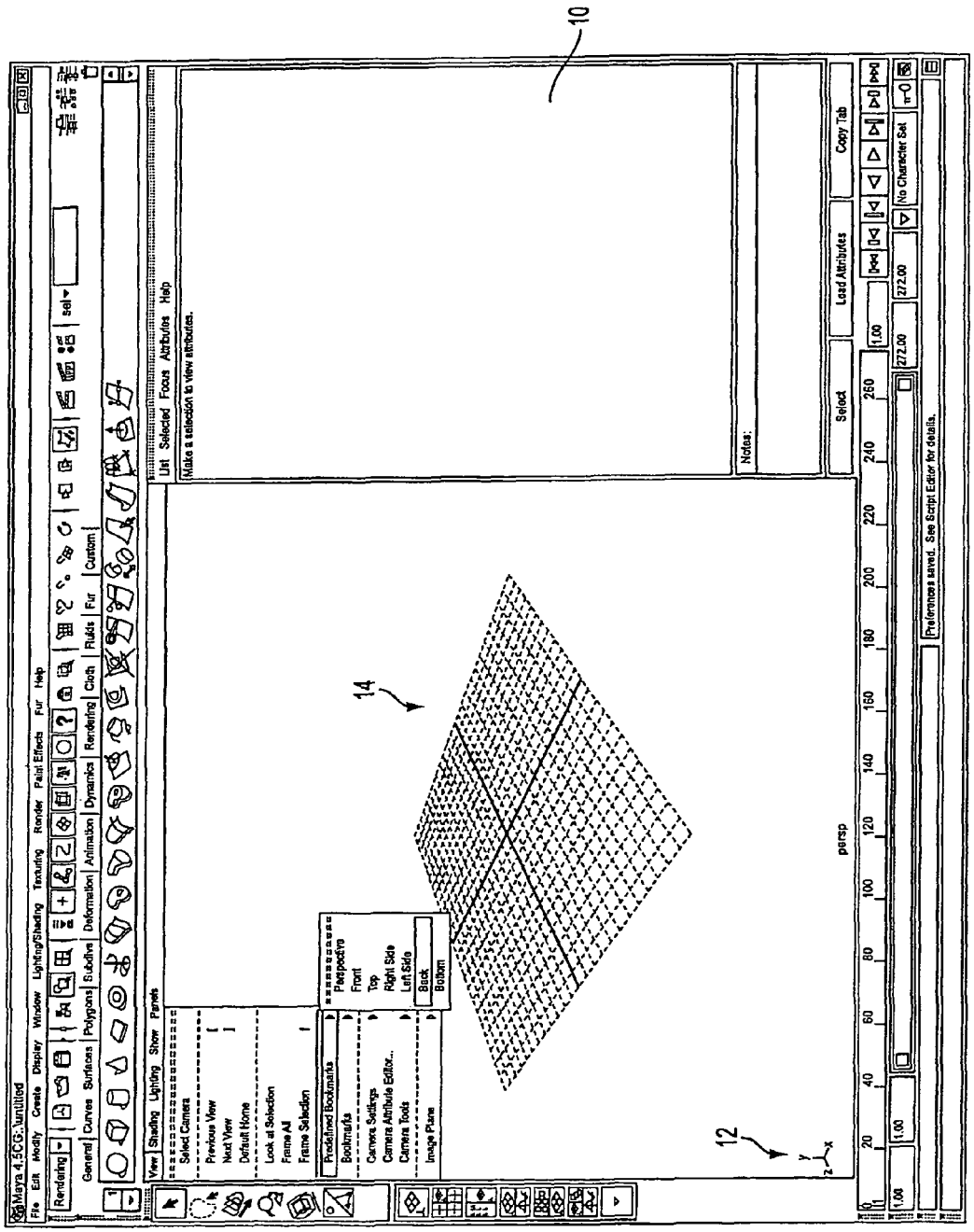
FIG. 1 illustrates a conventional 3D display with a menu for selecting a view of a scene to be displayed.
Figure 2:
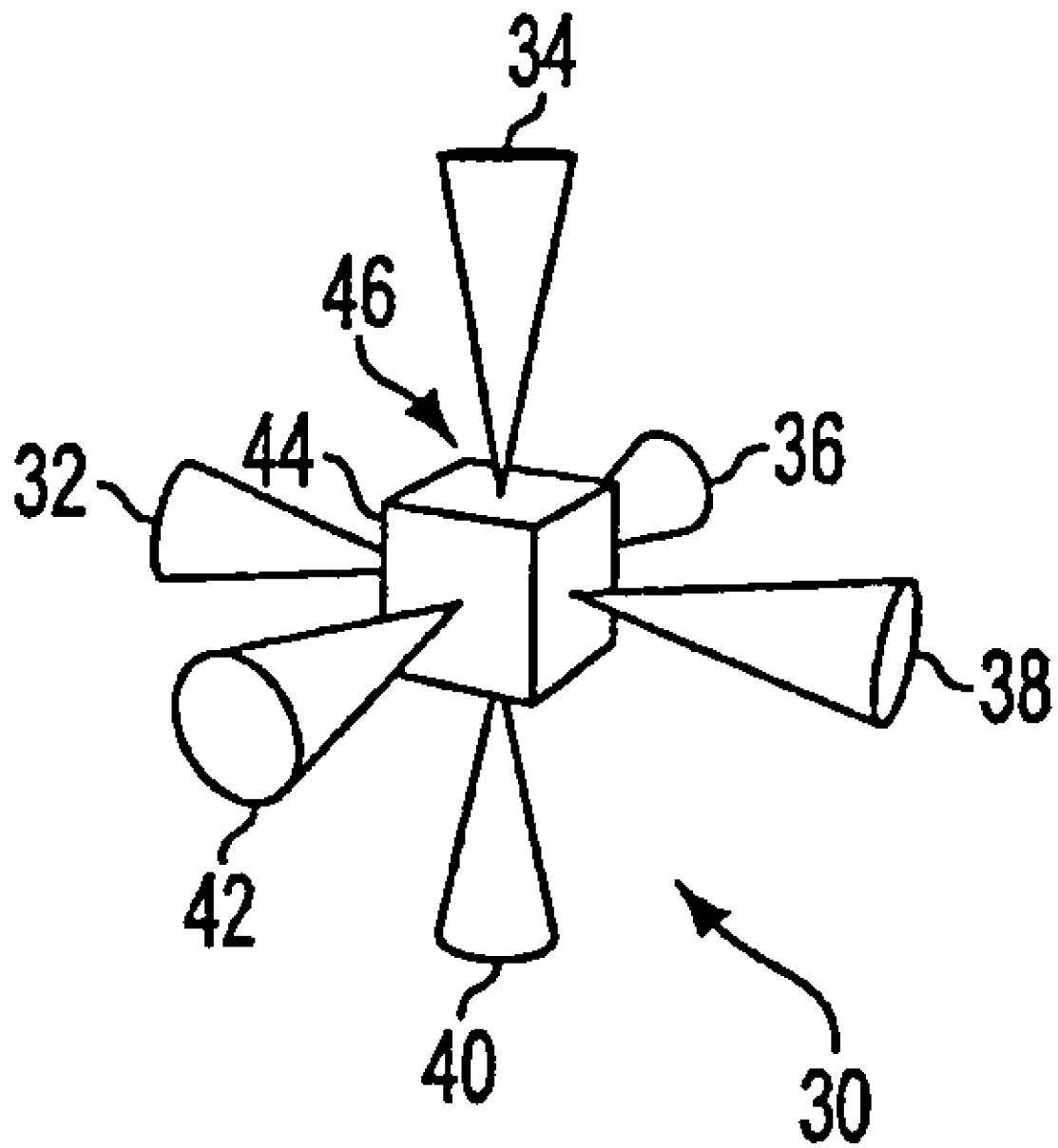
FIG. 2 depicts a view compass or GUI element according to the present invention.

The view compass 30, as depicted in FIG. 2, is a collection of seven virtual buttons or handles 32-44, represented as a 3D figure (widget) on a computer display. The buttons are conventional virtual buttons in that the operating system user interface recognizes that an action is to be taken when a cursor is on one of the buttons and a mouse button is activated or "clicked". The compass 30 becomes or is an element of a 3D scene, such as those used for modeling, CAD, or videogames. These seven buttons or controls 32-44 provide shortcuts for moving the virtual camera in (or viewpoint of) the scene to pre-defined positions.

The view compass 30 is unique in that its position is coupled to the virtual camera or the point of view into the 3D scene as established by an associated system, such as the Alias ImageStudio™ system, making it always available in the same place. The orientation of the compass 30 is locked to the orientation of the virtual 3D world, so that the action of each view-changing handle is visually obvious. This is a change from current ways of switching views in 3D software, as discussed above, that require the user to mentally calculate (or guess) which absolute position they need to switch to in order to get the view they want.

The view compass 30 is drawn as a 3D figure, comprising a core handle (or control) 44 with six handles (or controls) 32-42 arranged peripherally around it (one handle on either side in each of the X, Y, and Z directions). The compass 30 preferably has a form, as depicted in FIG. 2, that allows most or all of the handles to be visible (and therefore pick able) at any given time. For Alias ImageStudio™ we prefer a cubic core 44 with cone-shaped handles 32-42, but many other forms are possible as will be discussed later herein. Preferably, the entire visible portion of a cone is a control.

Figure 14:
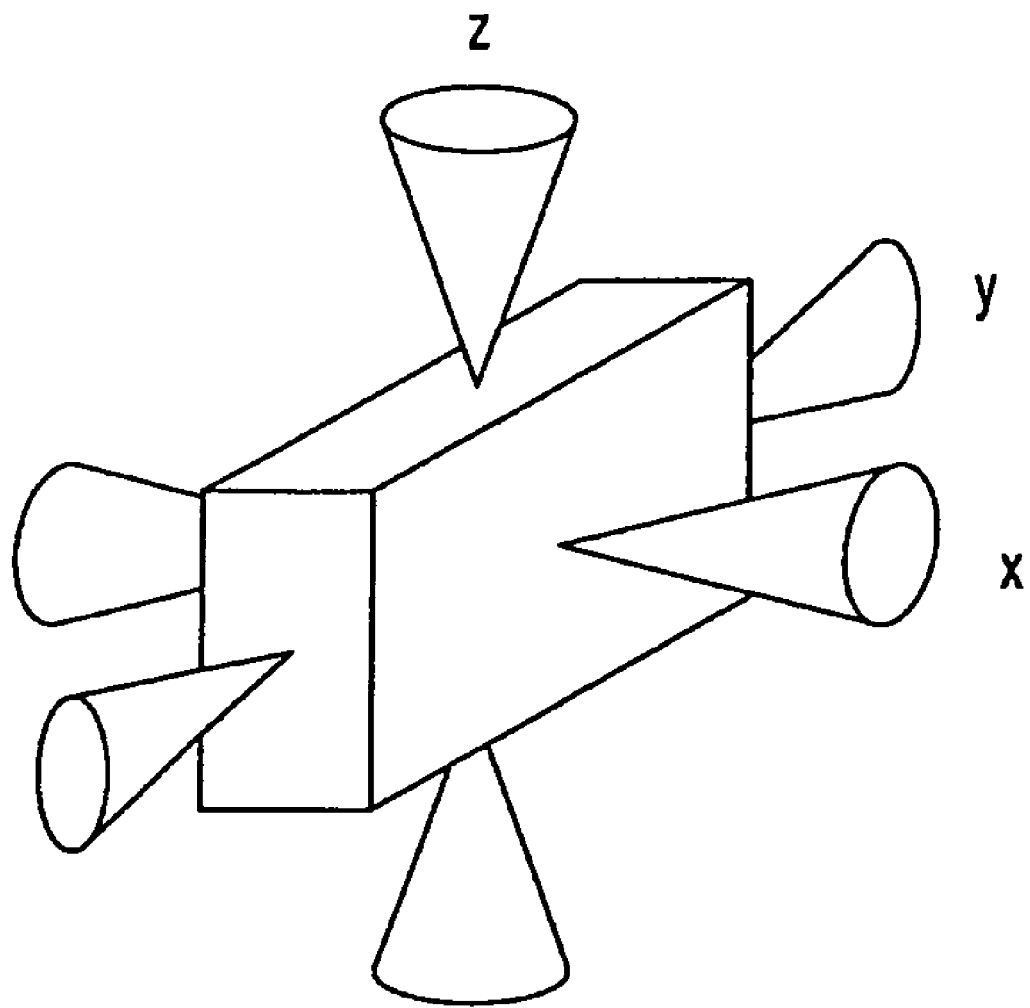

The preferred compass 30, as noted above, includes cone shaped handles 32-42 where the point 46 of the cone preferably points in the direction of the virtual camera view point, which provides a visual and somewhat intuitive information about what view will be provided when the handle is selected. The compass 30 preferably also has some additional visual cues. One of the handles, in this case handle 44, is a different color to mark it as the "front" direction of the scene, and the system can label the positive X, Y, and Z axes associated with the handles (see FIG. 14). These refinements are not required to make the view compass work well, but are preferable additions.

There are a number of aspects of the view compass 30 that it is important to understand. The first is how the compass 30 it behaves in the scene since it is part of the scene. As the scene view is changed the compass 30 changes with the scene. For example, as the scene is tumbled, because the compass is in the scene, the compass 30 also tumbles with the scene automatically maintaining an orientation that matches the orientation of the scene. However, as the scene is tumbled, the compass would normally move within the display view or virtual camera view of the scene provided to the user. As another example, because the compass is part of the scene, if the user zooms into the scene, the size as well as the position of the view compass 30 would be expected to change in the display image or display view presented to the user. The present invention preferably maintains the compass in the same position (preferably a display corner) and at the same size, as will be discussed in more detail below. A second aspect is how the displayed scene changes when a handle of the compass is selected. When a handle is activated the scene is switched to the viewpoint of the handle, the 3D scene object is centered and the display view is resized (zoom-in or zoom-out) so that the object fits within the display as will discussed in more detail later herein.

Figure 3:
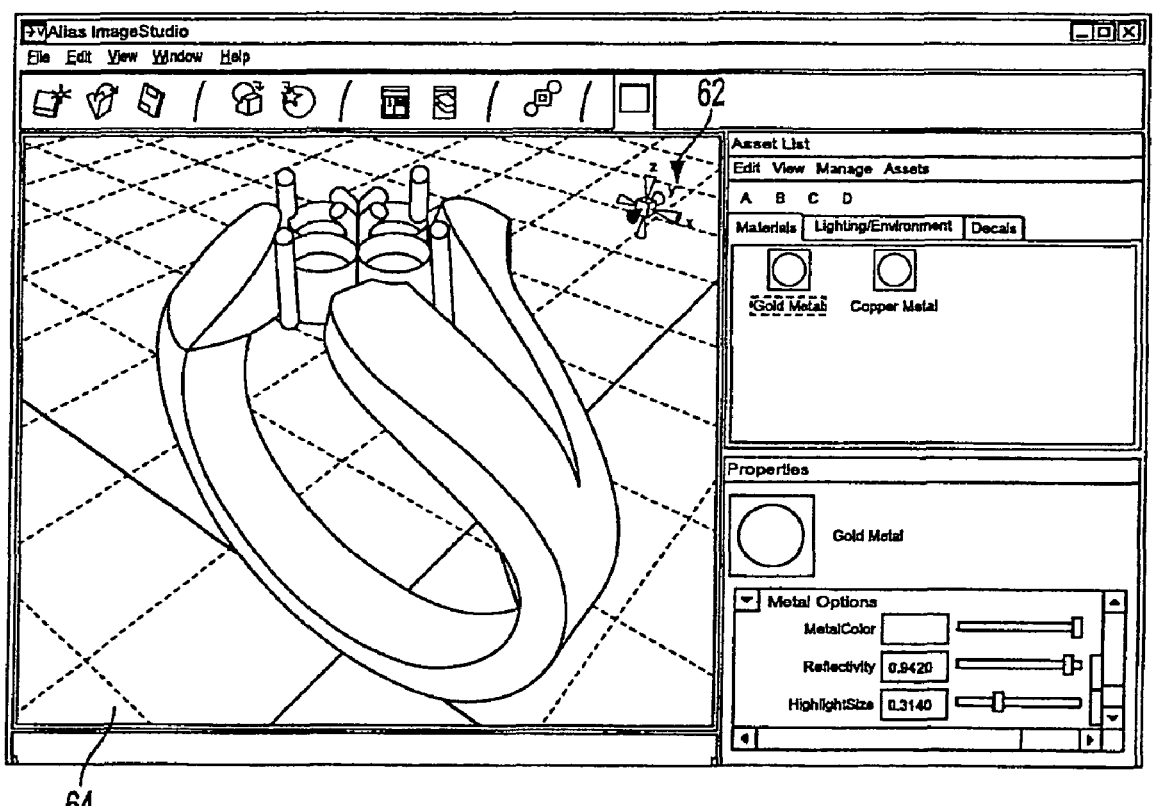
FIG. 3 shows a view compass in a 3D scene.

At all times, the view compass 62 is preferably drawn in the view 64 that it controls. Its position and size are fixed relative to the virtual camera (and in terms of the number of pixels on the computer display, preferably about 110 by 110 pixels), but the compass 62 orientation is fixed relative to the 3D world coordinate system, as can be seen in FIG. 3. This way, as the camera moves, the view compass 62 stays constantly at one size, in one out-of-the-way corner of the screen (upper right in FIG. 3). In this position, it also tumbles to match the orientation of the virtual world (note that the front position points along the axis of the ring in FIG. 3). When the computer redraws the scene, the view compass 62 is preferably drawn last so that it is drawn on top of everything else in the scene. This ensures that the compass 62 is always visible, even if scene objects come between the compass 62 and the virtual camera. (Depending on the details of the particular graphics system being used, it may be necessary to turn off the z-buffer, or ensure that the compass is just past the near clipping plane.)

Set forth below is pseudo-code for an algorithm that can be implemented in a preferred graphic system in a language, such as C++, and that places the view compass 62 at a fixed position and size, while allowing it to rotate with the world axes.

```
// Information required for this procedure:
//
point cameraPosition;    // 3d position of the virtual camera
vector cameraDirection; // normalized vector in the direction of view
vector cameraUp; // normalized vector pointing "up" in camera-space
vector cameraRight; // normalized vector pointing "right" in camera-
space
angle viewAngle; // horizontal angle of the view frustum of this camera
angle viewAngleV; // vertical angle of the view frustum of this camera
int viewportWidth; // width of the screen display in pixels
int viewportHeight; // height of the screen display in pixels
const int compassSize; // size of the view compass in pixels
const int compassOffset;    // offset of the view compass center
                            // from the corner in pixels
procedure drawViewCompass( camera, viewport ){
    // calculate the width/height of the viewing frustum at
    // one unit in front of the camera
    //
    float frustumWidth = 2.0 * sin(viewAngle*0.5)/cos(viewAngle*0.5);
    float frustumHeight = 2.0 *
    sin(viewAngleV*0.5)/cos(viewAngleV*0.5);
    // calculate the width of a pixel at a distance one unit in front
    // of the camera
    //
    float pixelSize = (frustumWidth/viewportWidth);
    // calculate the size of the compass in real-world units
    //
    setCompassSize( compassSize * pixelSize );
    // calculate the position of the compass center
    //
    setCompassPosition( cameraPosition + cameraDirection +
        ((frustumWidth*0.5)−(pixelSize * compassOffset)) * cameraRight +
        ((frustumHeight*0.5)−(pixelSize * compassOffset)) * cameraUp);
    // No need to set the orientation; it's always aligned with the
    // world. we can now draw the compass at the appropriate position,
    // size, and orientation.
    ...
```

The process set forth above starts by calculating how big the view compass would have to be in 3D space to maintain the same apparent size in pixels on the current display. This can change based on the focal length of the virtual camera, or on the size of the window in which the program is running. Next, the process calculates where in 3D space the view compass would need to be located in order to maintain the same apparent position relative to the camera. Once that is done, the compass widget itself can be drawn in a conventional way.

Figure 4:
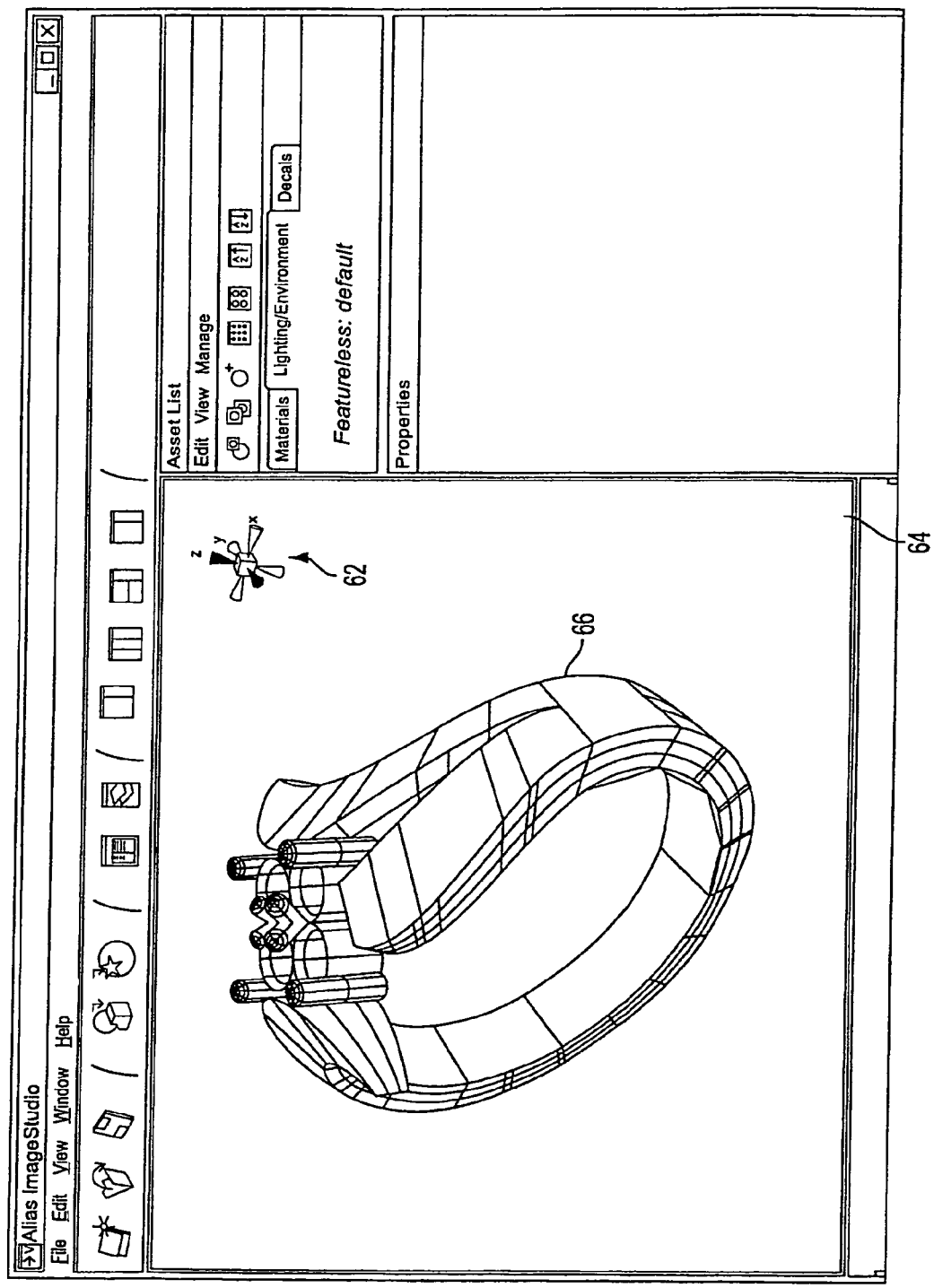
FIGS. 4-7 illustrate changes in view of a scene and corresponding changes in the view compass.
Figure 5:
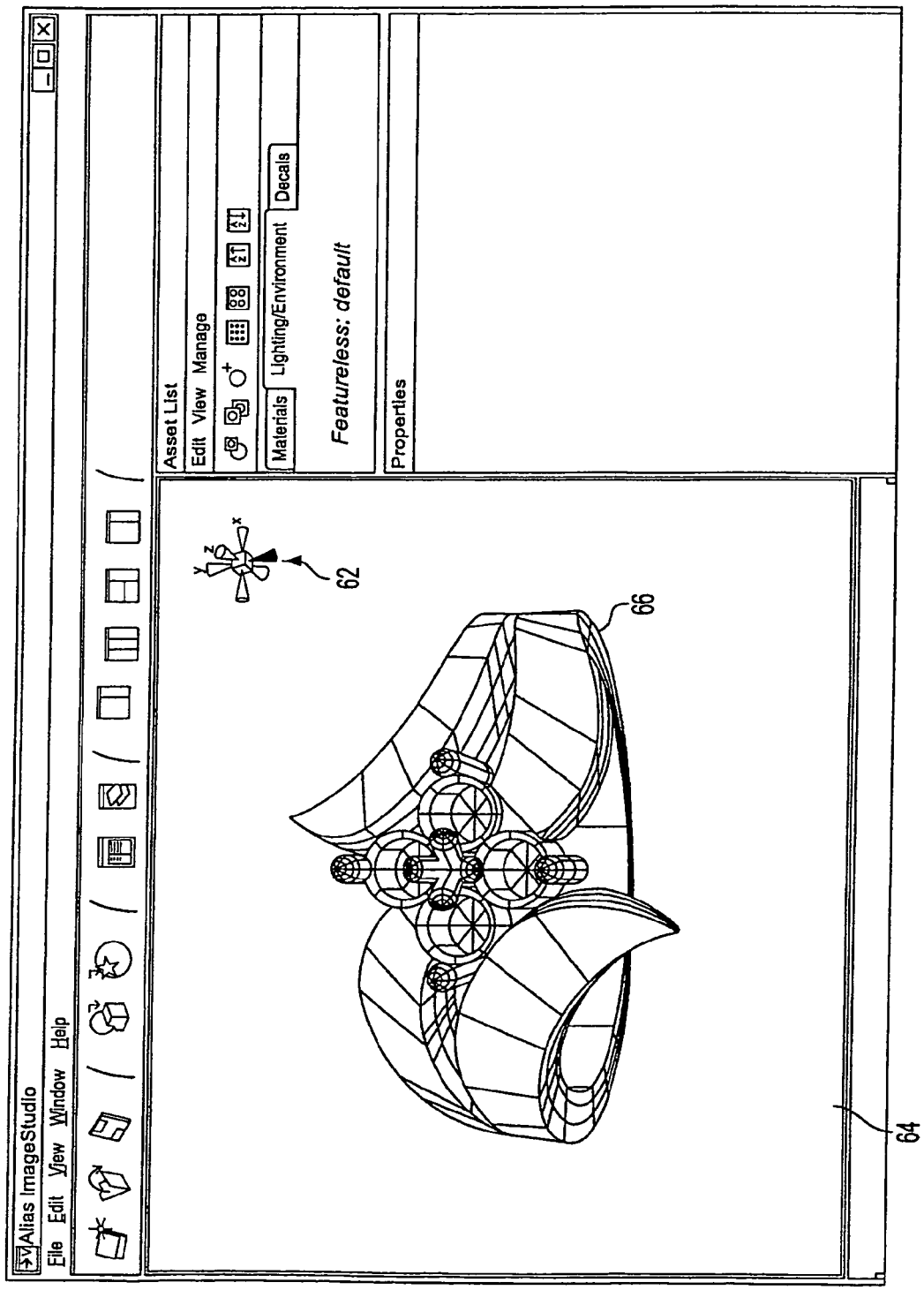
Figure 6:
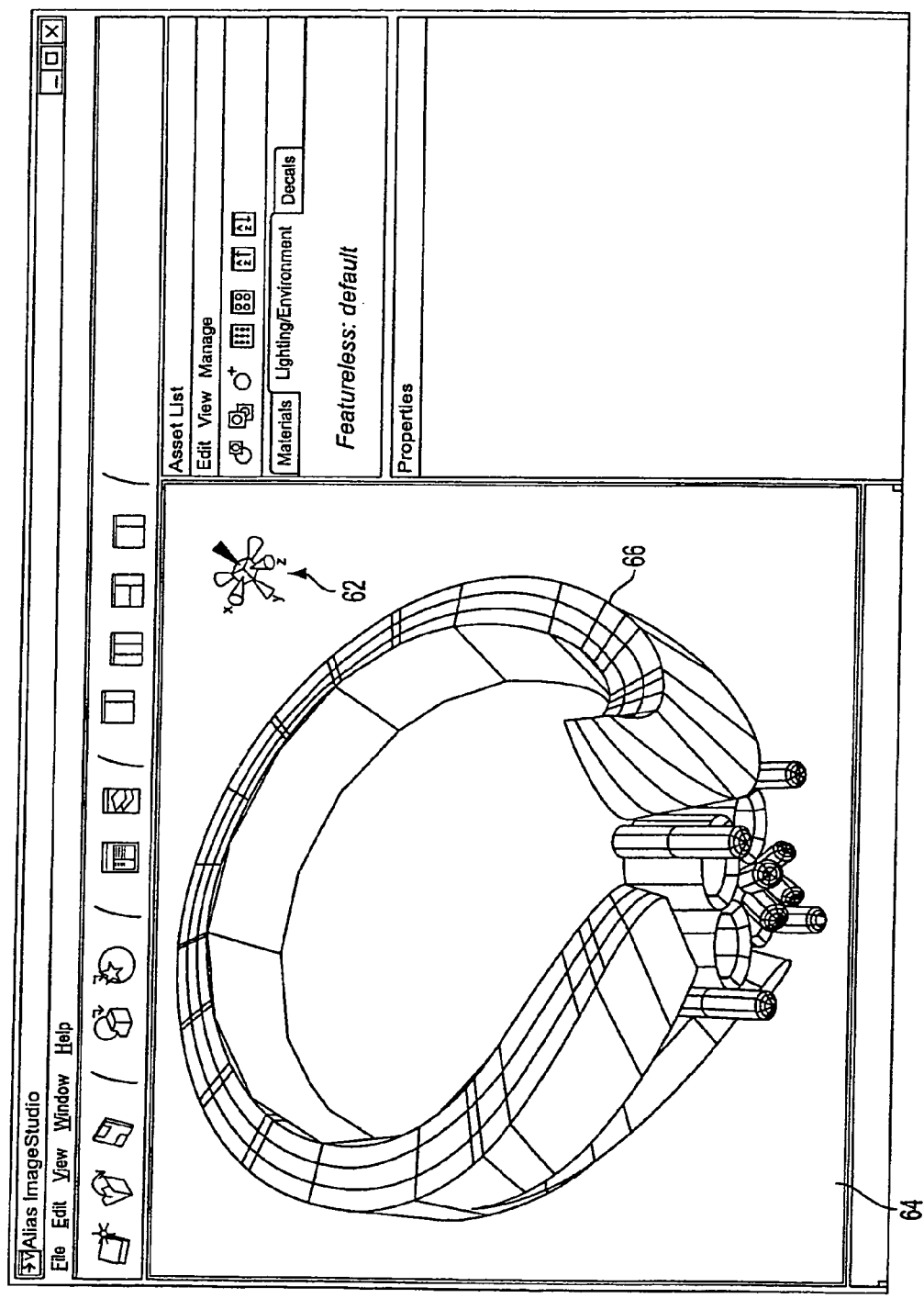
Figure 7:
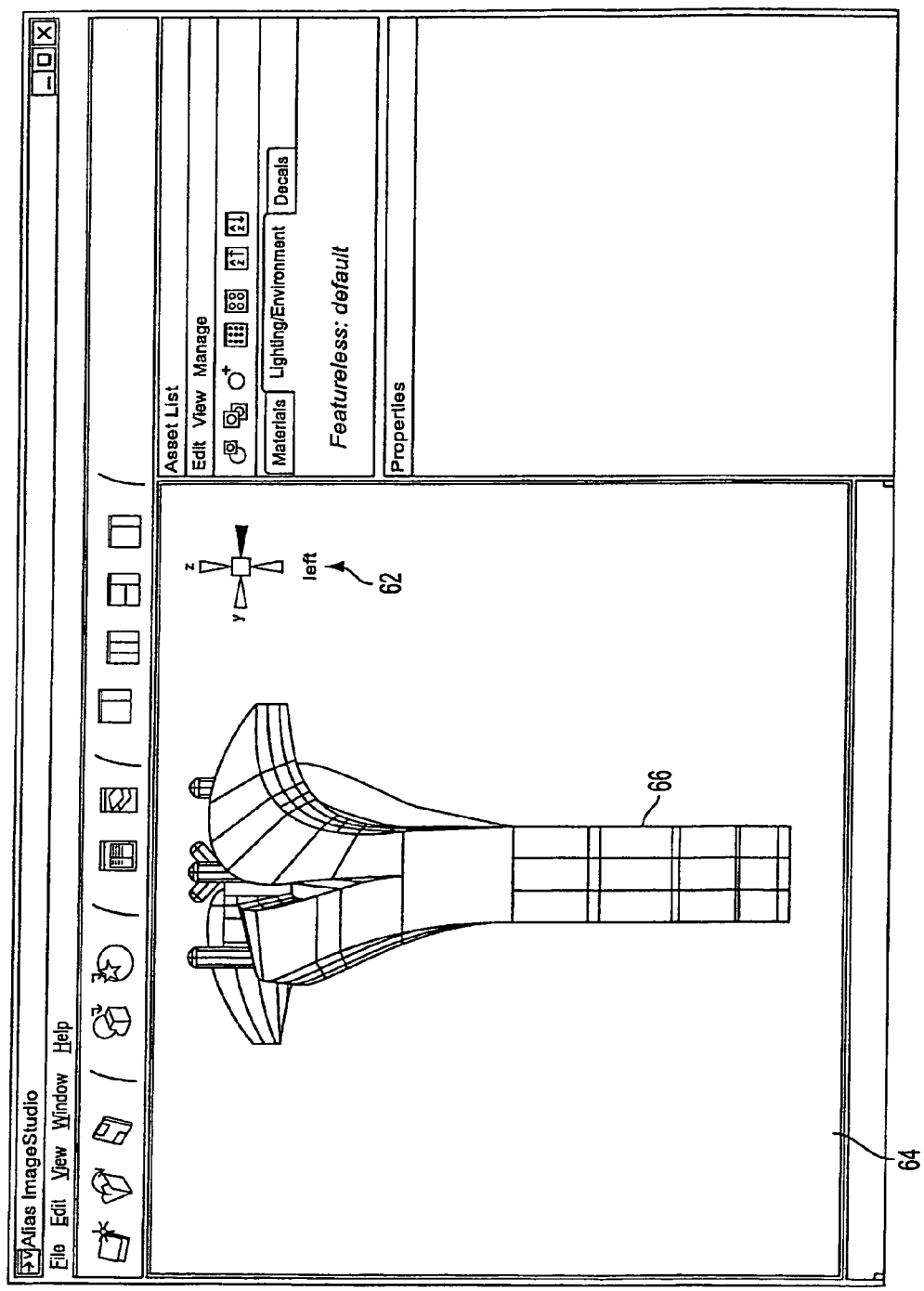

The process discussed above is executed each time the user changes the viewpoint of the scene, such as by tumbling, rotating, translating, etc. the scene. This is depicted in FIGS. 4-7, which show a user tumbling the view from a perspective view (FIG. 4) to an offset top view (FIG. 5), then to an upside down view (FIG. 6) and finally to a left side view (FIG. 7). In FIG. 4, the front cone of the compass 62 is pointing perspectively in alignment with the axis of the ring scene object 66 in the scene 64. FIG. 5 shows the compass 62 also in the same corner and the same size as in FIG. 4, even though the ring appears to have become a bit larger while the compass 62 has also been tumbled to keep the front cone aligned with the ring axis and in the relative front position of the ring 66. FIG. 6 again shows the compass 62 in the upper right hand corner at the same size and tumbled to be in alignment with the scene 64. FIG. 7 depicts the view compass 62 in a left side view aligned with the ring 66, so that the front cone points in the axial direction of the ring 66.

In addition, the above discussed compass move and resizing process is executed each time the user changes the viewpoint of the scene by selecting one of the controls of the view compass as discussed below.

Figure 8:
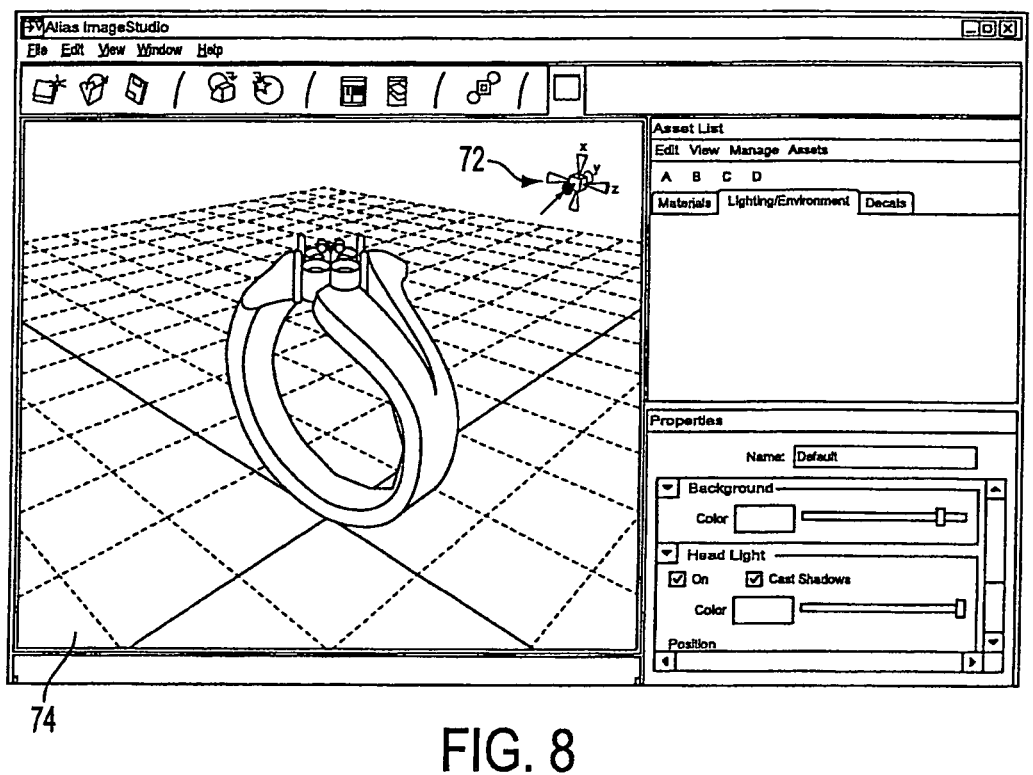
FIG. 8 illustrates a handle/control of the compass being highlighted as a cursor passes over the handle.
Figure 9:
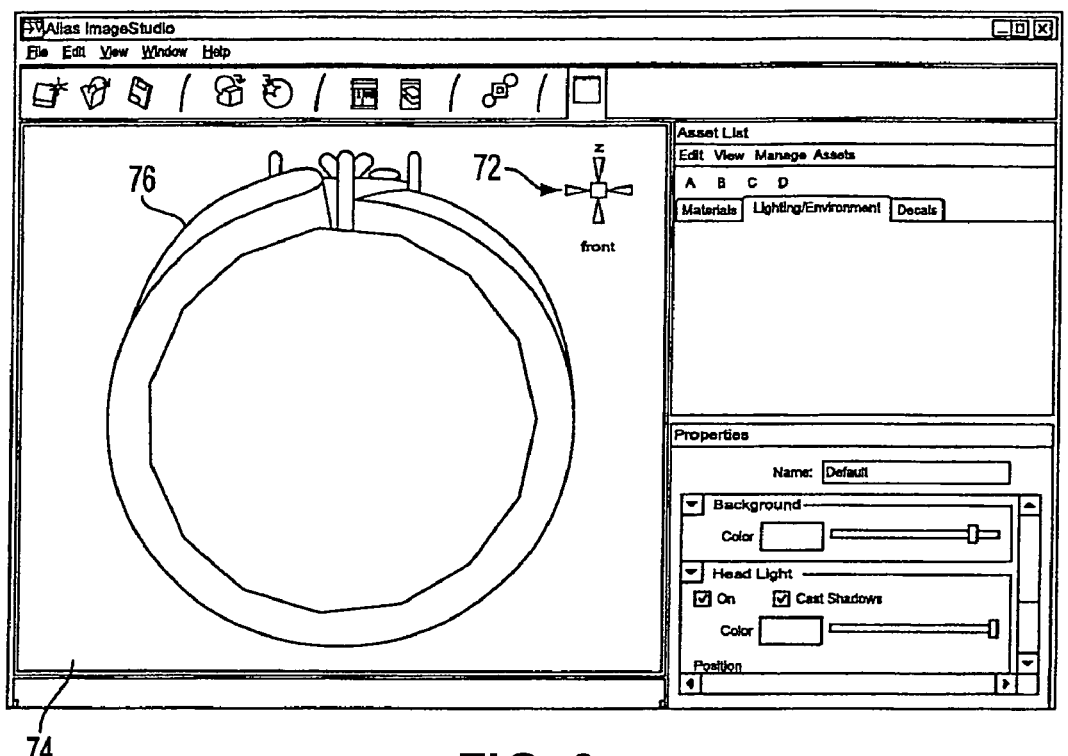
FIG. 9 illustrates the orientation after the handle highlighted in FIG. 8 has been selected.

As discussed above, each handle of the view compass 72 acts as a button or control. As a cursor passes over each handle, as depicted in FIG. 8, the handle is conventionally highlighted in the scene 74 to show that the handle will be picked if the user clicks-on or selects the handle. When the user clicks-on one of the cone handles, the camera moves to align its view direction with the axis of the cone as depicted in FIG. 9. (That is, the camera turns around the scene to point the same way that the cone points.) After the click in FIG. 8, the camera is now looking along the same axis as the clicked handle, down the center of the ring 76 in the scene 74, and the screen is filled with the object of interest (the ring 76 in this example) as shown in FIG. 9. The view compass 72 has the same relative position and size in the scene 74, but has rotated to a new orientation, matching the worldview. Once in selected orientation, the virtual camera or display view is repositioned so that objects of interest in the scene are centered and made to fit into the view, as shown in FIG. 9. The objects of interest depend on the application. For example, the view compass could focus on selected objects, or on all objects. The camera, as shown in FIG. 9, also switches from a perspective to an orthographic mode. When the user clicks-on or selects the center handle or core (see 44 of FIG. 2) of the view compass, the camera rolls to a predefined view such as the a predefined perspective view, such as the home view depicted in FIG. 8. Again, the camera adjusts its position to ensure that all objects of interest are made to fit into the view. The operations of the software that controls how the compass behaves will be discussed in more detail below with respect to FIG. 10.

Figure 10:
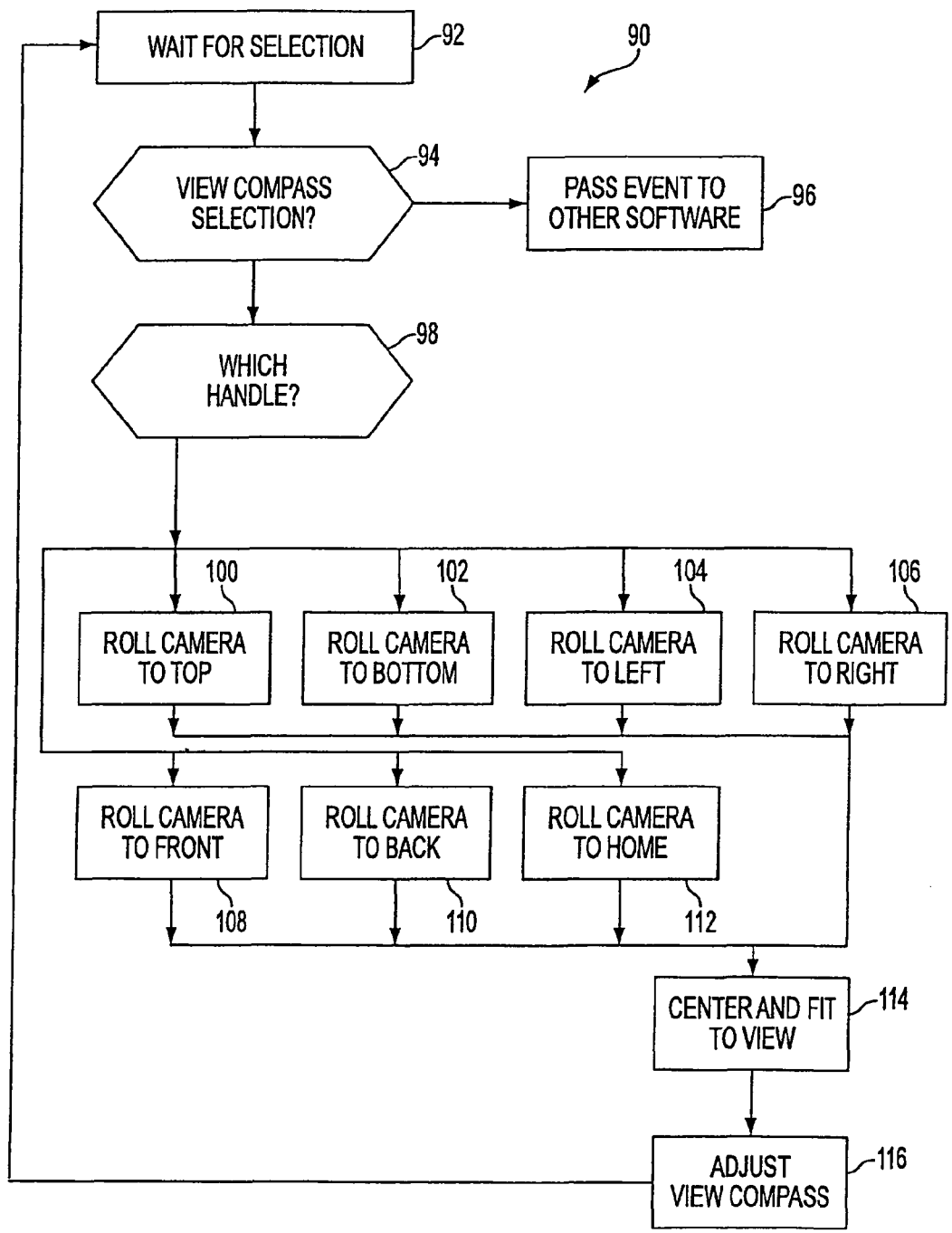
FIG. 10 is a flowchart of the process performed when a control of the compass is selected.

The flowchart of FIG. 10, for convenience, depicts a process 90 that is sequential. However, when implemented in an object-oriented language, such as the preferred C++ language, the tasks may be distributed into objects that may not be sequentially organized. Before any selection is made, a conventional operation (not shown) highlights any handle over which the cursor passes and the process waits 92 for a selection. Where a selection is preferably first processed by the compass behavior software described herein. If the cursor is used to make a selection, such as by clicking a button on a mouse or engaging a key on a keyboard, the process leaves the wait state 92, and a determination 94 is made as to whether the selection, cursor click-hit, is a selection of a control of the view compass. If not, the selection event is passed 96 to other software of the system. If so, a determination 98 is made as to which handle or control has been hit. If the top handle is selected (hit), the view or virtual camera is conventionally rolled or tumbled 100 to display the top view to the user. If the bottom handle is selected (hit), the view is conventionally rolled 102 to display the bottom view. Likewise for the left (104), right (106), front (108) and back (110) views. When the home or core control is selected, the view provided to the user is rolled 112 to the perspective view. The system then conventionally centers 114 the object of interest and fits the display size to the object as previously discussed. Next, the view compass size and position are adjusted 116 in the 3D scene to place the compass in the desired predetermined position at the predetermined size. The system then returns to await another input event.

Figure 11:
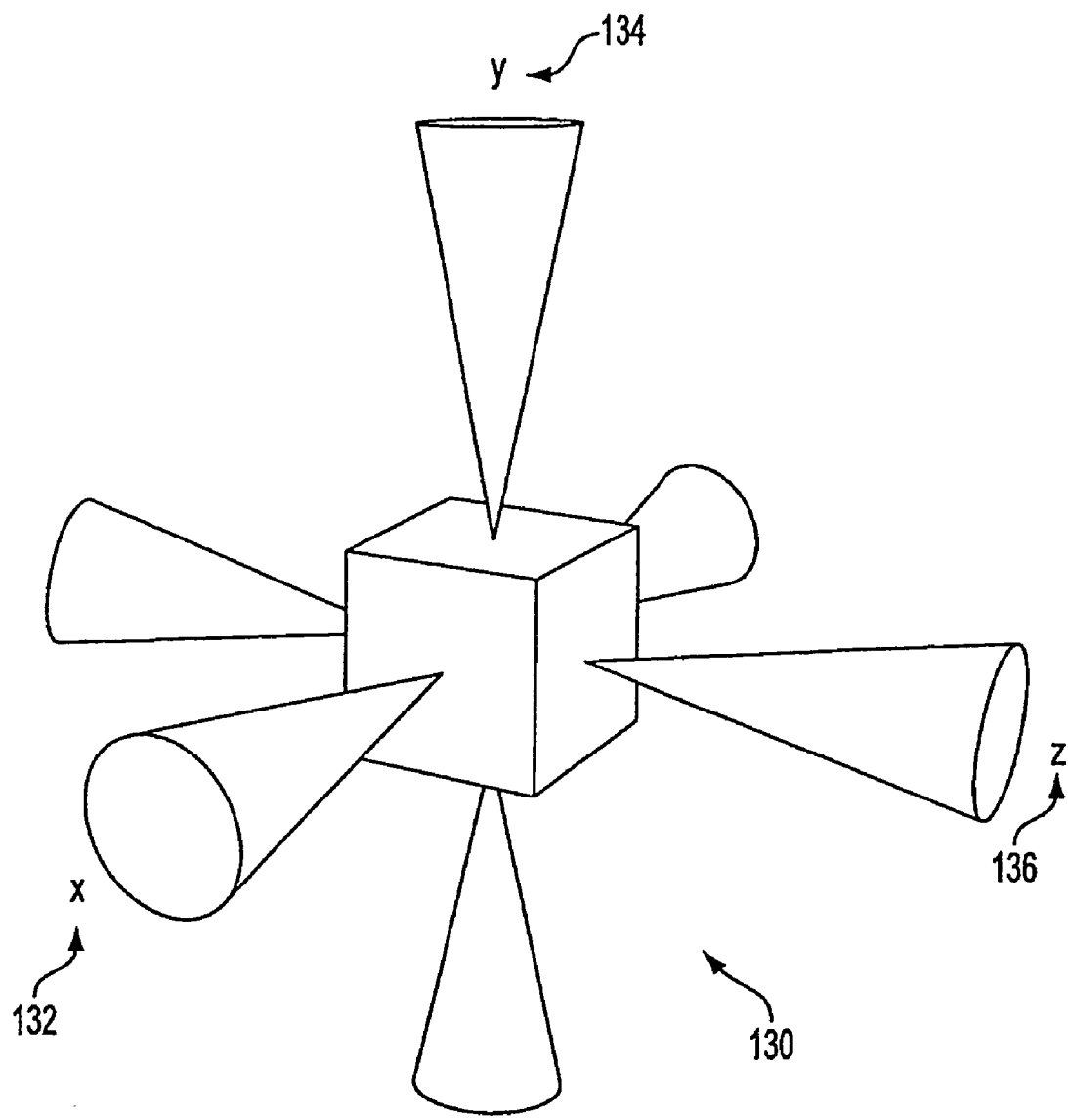
FIGS. 11-17 illustrate additional embodiments of the present invention.
Figure 12:
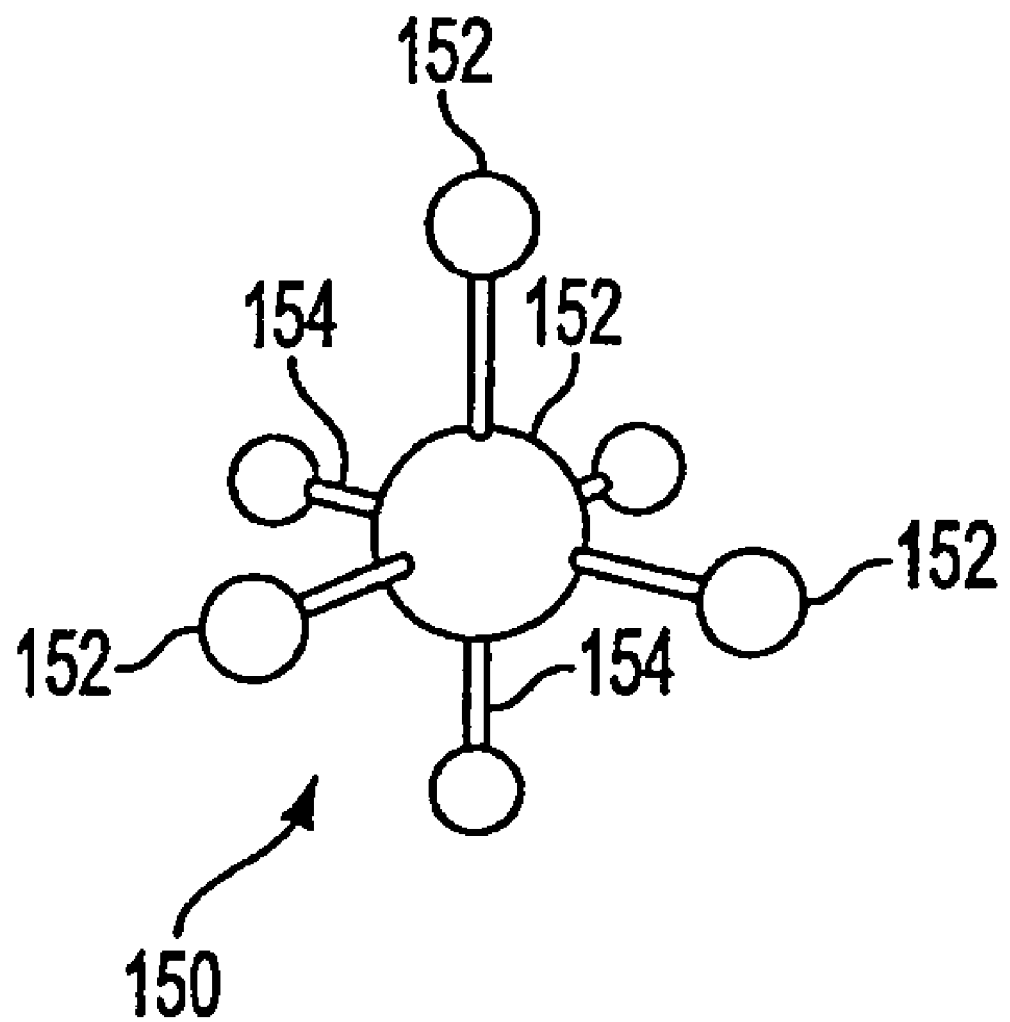
Figure 13:
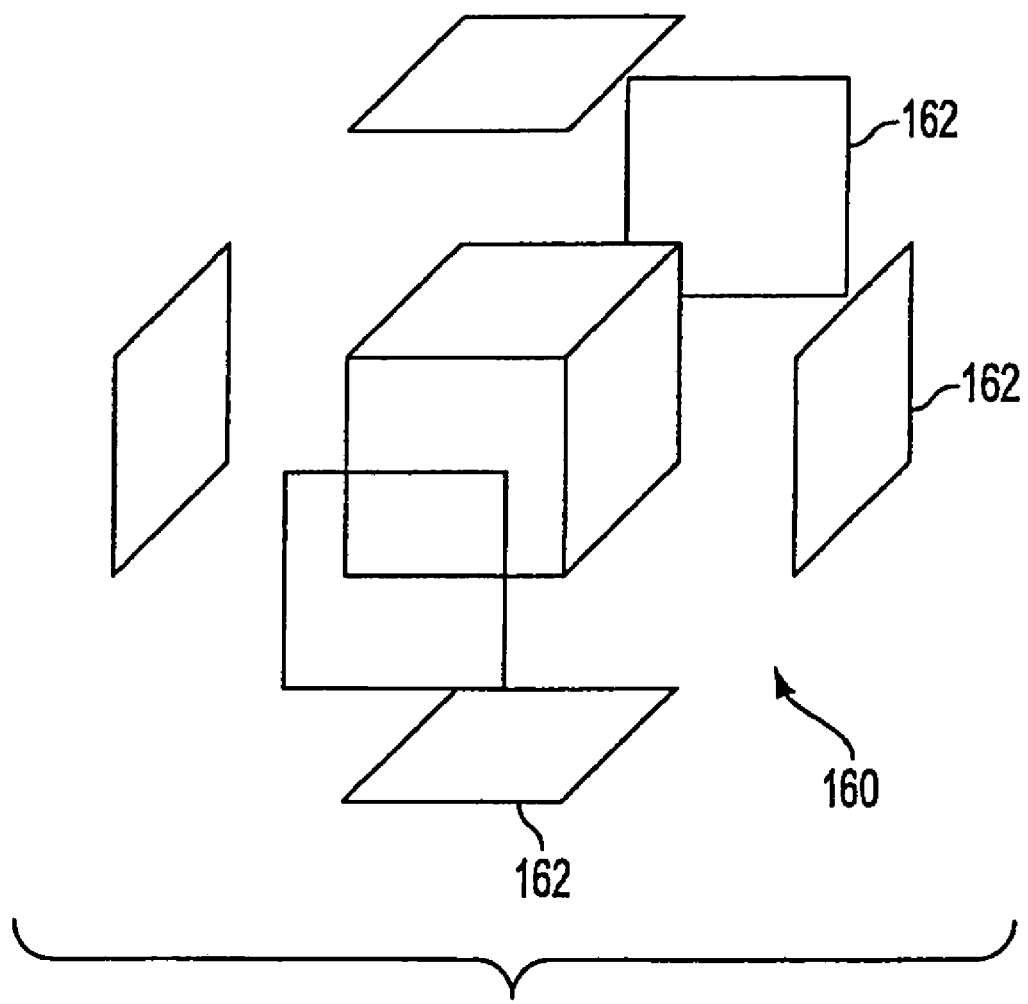
Figure 15:
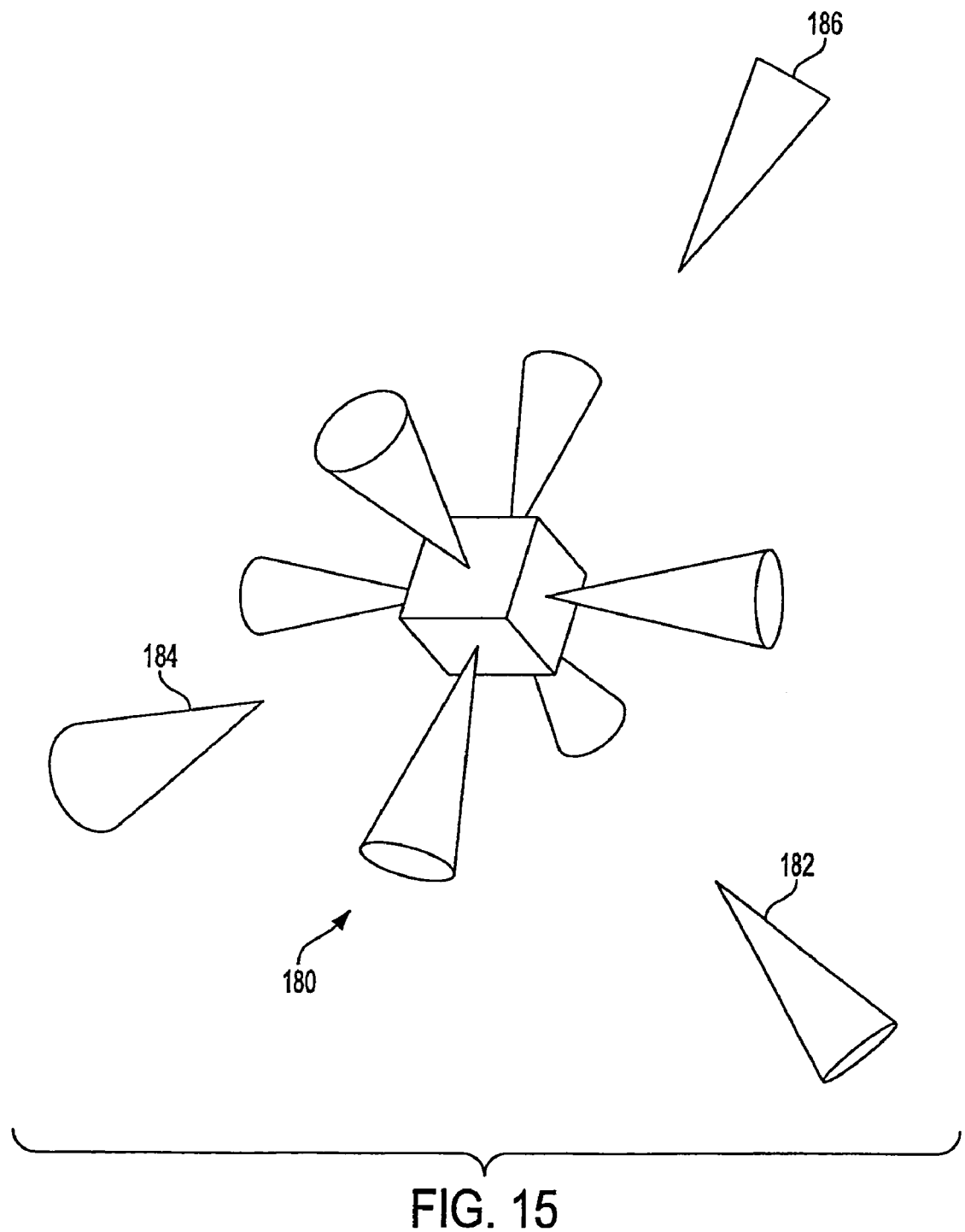
Figure 16:
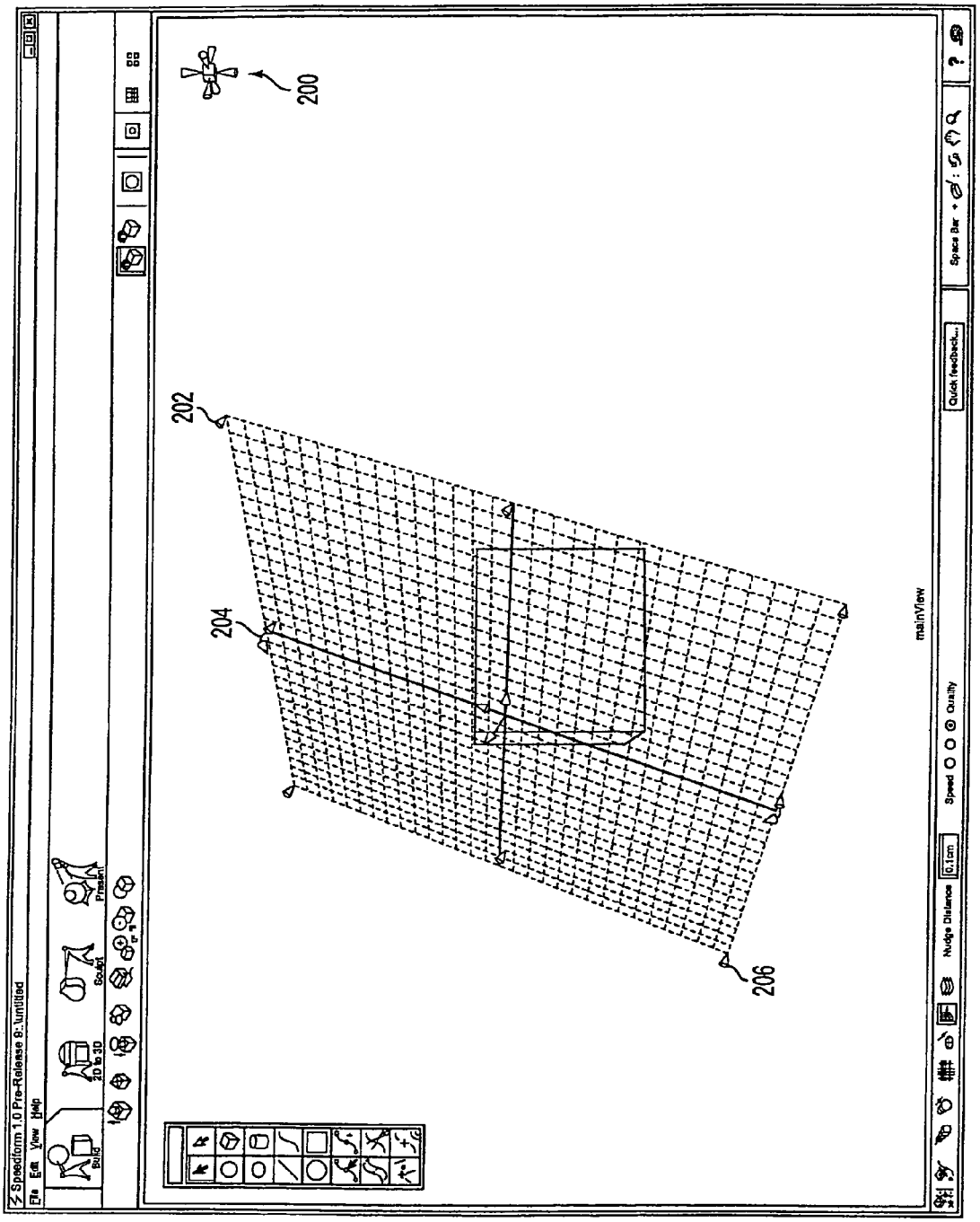
Figure 17:
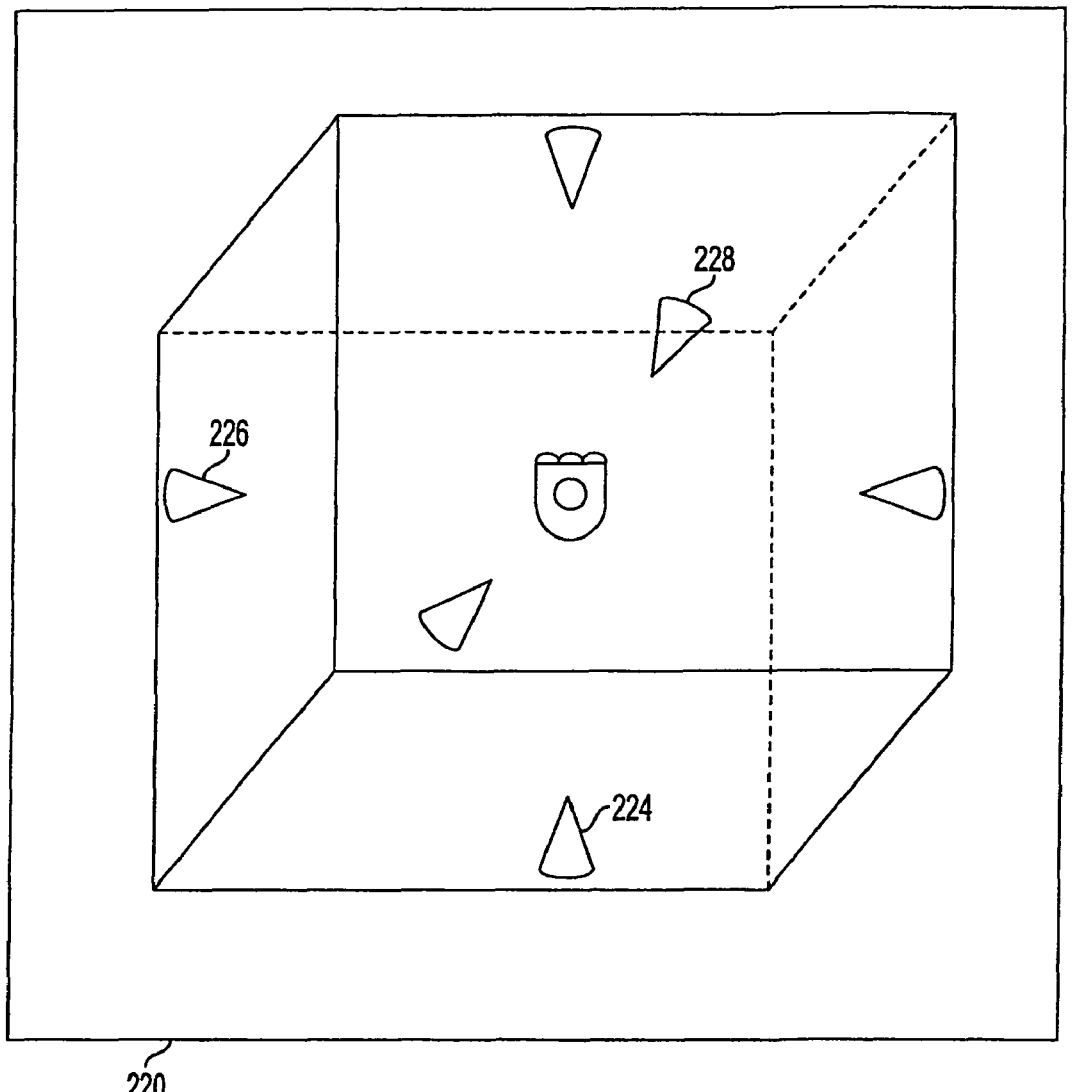

The view compass of the present invention can have a number of different shapes or other features that allow the direction of the view to be visualized, that depict the orientation and that are easy to select. The cone shaped controls of FIG. 2 can be pyramid shaped. Arrows can be substituted for the cones. FIG. 11 depicts a compass 130 with axial indicators 132, 134 and 136 for the xyz axes. FIG. 12 illustrates a compass 150 where balls 152 are the controls and the links 154 between the balls 152 indicate view direction. That is, the stick of the ball and stick combination points at the core indicating view direction. FIG. 13 shows a compass 160 where the views are indicated by planes or windows 162. The direction of the view is indicated by the location of the window and by the view through the window to the core. FIG. 15 shows a compass 180 with view bookmarks 182, 184 and 186 that indicate additional system or user created views to which the system can align the scene when selected. These additional views can be used for special purposes, such as in modeling where people often want to "bookmark" certain views, that is, save them because they contain an attractive angle for rendering, or because they are focused on a particular detail that they want to work with, and need to get back to periodically. Or, the user may be saving views of particular interest to point them out to a colleague. Additional components or scene views markers associated with the view compass can be provided as depicted in FIG. 16. In this embodiment, the view compass 200 has additional view markers, such as 202, 204 and 206, arbitrarily located at segment boundaries of a grid plane and that cause the display view to align with the particular plane of the view marker when selected. The view markers of the present invention can also be exploded as depicted in FIG. 17 where the display view 220 is of the entire 3D scene 222 and the markers or controls, such as controls 224, 226 and 228 are located at the periphery of the scene.

Figure 18:
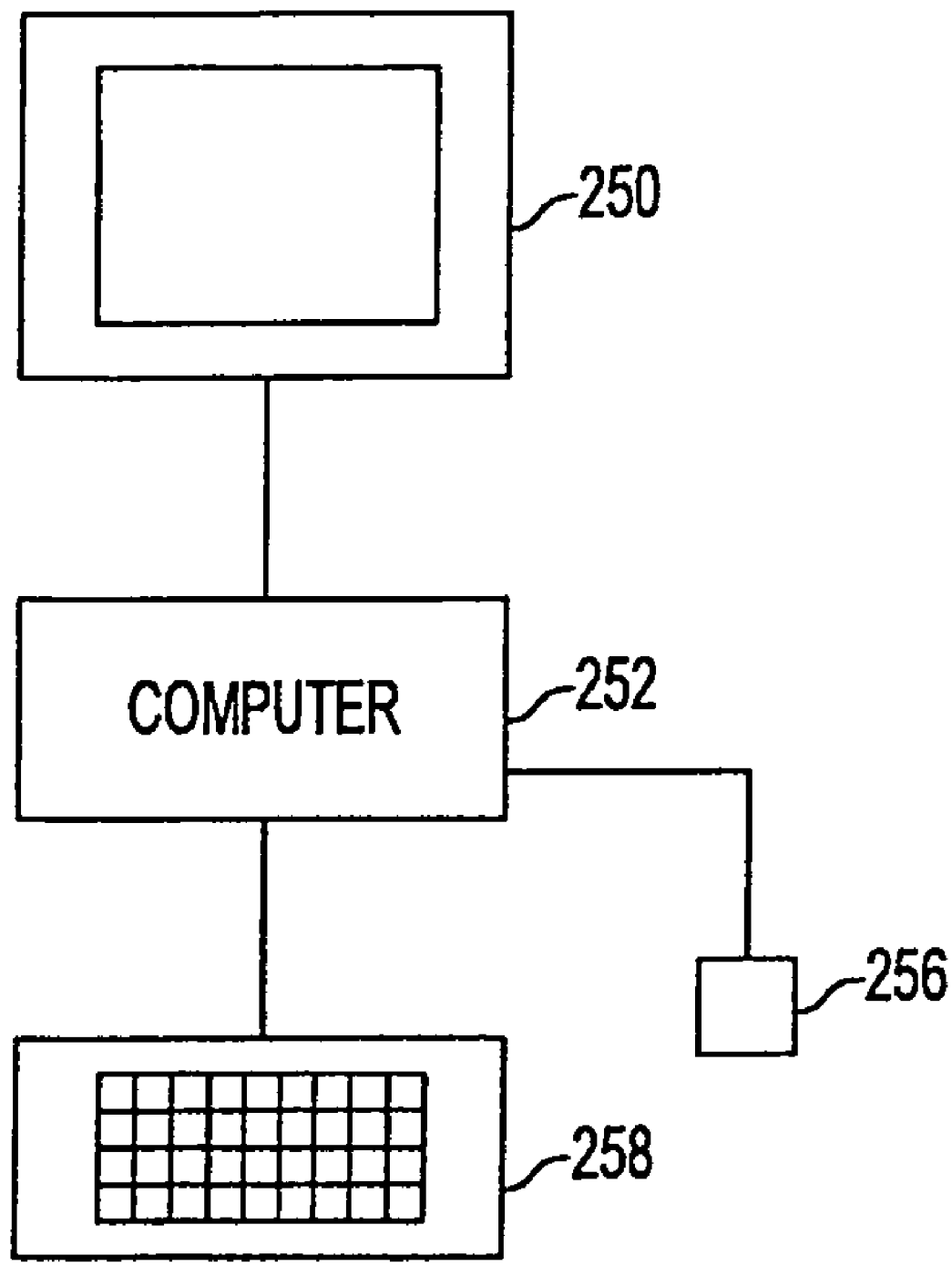
FIG. 18 illustrates hardware of the present invention

FIG. 18 illustrates hardware of the present invention where the 3D scene, including the view compass, is depicted on a display 250, such as a CRT, PDP or LCD. A computer 252, such as desk top computer, runs the processes of the present invention, along with the 3D graphics software, that allow the user to manipulate the scene and select controls on the display, via input devices, such as a mouse 256 and keyboard 258. Other input devices can also be used, such as tablets, gloves, etc., that allow a user to point at and select objects.

The system of the present invention also includes permanent or removable storage, such as magnetic and optical discs, RAM, ROM, etc. on which the process and data structures of the present invention can be stored and distributed. The processes can also be distributed via, for example, downloading over a network such as the Internet.

The present invention has been described with the visible part of each cone being a control. It is possible to have a region around each cone that also acts as a control. The axis labels (x, y, z) can also be part of the controls. The present invention has been described as making a front cone a different color to indicate a front direction of the compass and scene. It is possible to make a front face of the core 44 a different color either in addition to or as a substitute for the coloring of the front cone. Iconic representations of the contents of the scene from the various points of view can also be placed on the core faces.

It is also possible to use the compass as a tumbling tool such that dragging a cone will turn the scene. It is also possible to drag an image, such as a texture, and drop it on a cone and have the system paste the image on a part of the scene such as a wall.

The many features and advantages of the invention are apparent from the detailed specification and, thus, it is intended by the appended claims to cover all such features and advantages of the invention that fall within the true spirit and scope of the invention. Further, since numerous modifications and will readily occur to those skilled in the art, it is not desired to limit the invention to the exact construction and operation illustrated and described, and accordingly all suitable modifications and equivalents may be resorted to, falling within the scope of the invention.

What is claimed is:

1. A graphical user interface element displayed on a display, comprising:
    a three-dimensional orientation indicator widget (widget) positioned in and displayed in association with a three-dimensional scene and visually indicating an orientation of the scene, and said widget comprising:
    view direction controls (controls) each indicating a direction of a corresponding view into the three-dimensional scene and causing a display view orientation of the three-dimensional scene to change to a corresponding predefined view orientation upon selecting one of the controls and where the controls rotate in direct correlation to the change in the display view orientation, wherein
    the controls indicate an iconic representation of the scene to display when selected and perform an action on a corresponding part of the scene when an image is dragged and dropped on any one of corresponding controls.

2. The graphical user interface element as recited in claim 1, wherein an object in the scene is centered and sized to fit the display view when a scene change occurs responsive to selection of one of the controls.

3. The graphical user interface element as recited in claim 1, wherein the widget is part of the three-dimensional scene, always positioned at a predetermined position in the display view and always substantially a same size in the display view.

4. The graphical user interface element as recited in claim 1, wherein the widget comprises: a central core control associated with a perspective view of the scene; and axial controls peripherally positioned with respect to the core control, aligned with the axial dimensions of the scene and associated with corresponding front, back, bottom, left side and right side views.

5. The graphical user interface element as recited in claim 4, wherein the front direction control is different from the other controls.

6. The graphical user interface element as recited in claim 4, wherein the axial controls are each shaped to point at the core control indicating the view direction of the axial control.

7. The graphical user interface element as recited in claim 4, further comprising a non-axial control peripherally positioned with respect to the core control and indicating a direction of a corresponding view into the three-dimensional scene and causing a display view of three-dimensional scene to change to the corresponding view when selected.

8. The graphical user interface element as recited in claim 7, wherein the non-axial controls are specified by a user.

9. A process, comprising:
    determining whether one of a plurality of view direction indicating controls (control) of a three-dimensional orientation indicator widget (widget) positioned in a display view of a three-dimensional scene has been activated; and
    orienting the display view orientation to a predefined view orientation direction of the control upon activating the control and wherein the widget rotates in direct correlation to the change in the display view orientation, wherein the widget indicates an iconic representation of the scene to display when selected and performs an action on a corresponding part of the display view when an image is dragged and dropped on any one of the plurality controls of the widget.

10. A process as recited in claim 9, wherein the indicator is in the three dimensional scene and the process further comprises:
    positioning the indicator in the scene to place the indicator in a predetermined position in the display view; and
    changing the size of the indicator in the scene to fix the indicator at a predetermined size in the display view.

11. A process as recited in claim 9, further comprising:
    centering a scene object in the display view; and
    fitting the scene object to the display view.

12. A system, comprising:
    a display;
    an input device used to make selections on the display; and
    a computer coupled to the mouse and the display, displaying a three-dimensional scene on the display in a display view, the scene comprising a three-dimensional orientation indicator widget (widget) positioned in and indicating the orientation of the scene, the widget comprising view controls (controls) indicating a view orientation direction and the computer changing the display view orientation to a predefined view orientation direction associated with one of the corresponding controls upon selecting the control by the mouse and where the controls rotate in direct correlation to the change in the display view orientation, wherein the controls indicate an iconic representation of the scene to display when selected and perform an action on a corresponding part of the scene when an image is dragged and dropped on a corresponding control.

13. A computer readable storage controlling a computer by a process stored thereon;
    determining whether one of a plurality of view direction indicating controls (control) of a three-dimensional orientation indicator widget (widget) positioned in a display view of a three-dimensional scene has been activated and orienting the display view orientation to a predefined view orientation direction of the control upon activating the control and where the widget rotates in direct correlation to the change in the display view orientation, wherein the control indicates an iconic representation of the scene to display when selected and performs an action on a corresponding part of the scene when an image is dragged and dropped on any one of the corresponding controls.

14. A graphical user interface displayed on a display, comprising:
- a three-dimensional orientation indicator widget (widget) positioned in and displayed in association with a three-dimensional scene and visually indicating an orientation of the scene, and said widget comprising:
- view direction controls (controls) each indicating a direction of a corresponding view into the three-dimensional scene and causing a display view orientation of the three-dimensional scene to change to a corresponding predefined view orientation upon selecting one of the controls and where the controls rotate in direct correlation to the change in the display view orientation, wherein
- the controls indicate an iconic representation of the scene to display when selected and perform an action on a corresponding part of the scene when an image is dragged and dropped on any one of corresponding controls.

15. A system, comprising:
- a display, said display displaying a 3D scene and a 3D orientation indicator widget (widget) in association with the scene, the widget visually indicating an orientation of associated scene and rotating in direct correlation to a change in view orientation of the scene, and the widget comprising at least three view direction controls (controls) corresponding to each of the vertical, horizontal and depth axes of the scene and each indicating a direction of a corresponding view into the 3D scene, and each of the controls causing a display view orientation of the three-dimensional scene to discretely change to a corresponding predefined view orientation into the scene when each control is selected by clicking on the control with a cursor, wherein the controls indicate an iconic representation of the scene to display when selected and perform an action on a corresponding part of the scene when an image is dragged and dropped on any one of the corresponding controls.

16. The graphical user interface element as recited in claim 1, wherein the widget visually indicates orientation of an x, y, and z axis in relation to the scene.

17. The graphical user interface element as recited in claim 1, wherein the widget visually indicates top, bottom, left, right, front, and back in relation to the scene.

* * * * *